United States Patent
Chang et al.

(10) Patent No.: US 7,151,975 B2
(45) Date of Patent: Dec. 19, 2006

(54) SYSTEM AND METHOD FOR MONITORING WAFER FURNACE PRODUCTION EFFICIENCY

(75) Inventors: Topas Chang, Hsinchu (TW); Hsin Ten Wang, Hsinchu (TW); Chieh Chung Chang, Hsinchu (JP); Chuan Hua Chiu, Hsinchu (TW); Pei-Wei Kuo, Hsinchu (JP)

(73) Assignee: Macronix International Co., Ltd. (TW)

( * ) Notice: Subject to any disclaimer, the term of this patent is extended or adjusted under 35 U.S.C. 154(b) by 54 days.

(21) Appl. No.: 10/775,595

(22) Filed: Feb. 9, 2004

(65) Prior Publication Data

US 2005/0177263 A1 Aug. 11, 2005

(51) Int. Cl.
*G06F 11/30* (2006.01)
*G06F 19/00* (2006.01)

(52) U.S. Cl. .................. 700/108; 700/121; 700/174; 702/182; 438/5

(58) Field of Classification Search .......... 700/108, 700/117, 121, 159, 174; 438/5; 702/182
See application file for complete search history.

(56) References Cited

U.S. PATENT DOCUMENTS

2001/0047216 A1* 11/2001 Ando ................. 700/109
2002/0072162 A1* 6/2002 Dor et al. ................ 438/200
2002/0103563 A1* 8/2002 Izawa et al. .............. 700/121
2003/0164932 A1* 9/2003 Ikuno et al. ............... 355/53
2004/0073405 A1* 4/2004 Karasawa ................. 702/188
2004/0171234 A1* 9/2004 Takeno .................... 438/471

* cited by examiner

*Primary Examiner*—Jayprakash N. Gandhi
(74) *Attorney, Agent, or Firm*—Martine Penilla & Gencarella, LLP

(57) ABSTRACT

A system for monitoring wafer throughput per hour in a wafer furnace includes a database, an analysis unit, a comparison unit, and an output unit. The database includes two or more operation histories of the wafer furnace. The analysis unit is coupled to the database. The analysis unit includes logic that retrieves at least one operation history from the database, determines a standard process time and a specification range for the retrieved operation history, and receives a current process time for the current process. The comparison unit, which is coupled to the analysis unit, includes logic that compares the standard process time and the specification range to the current process time. The output unit, which is coupled to the comparison unit, includes logic that outputs a comparison result. A method for monitoring wafer throughput per hour in a wafer furnace also is described.

20 Claims, 4 Drawing Sheets

SYSTEM AND METHOD FOR MONITORING WAFER FURNACE PRODUCTION EFFICIENCY

BACKGROUND OF THE INVENTION

The present invention relates generally to wafer furnaces and, more particularly, to a system and method for monitoring wafer furnace production efficiency.

Wafer furnaces are used for numerous processes in the manufacture of semiconductor devices. For example, ion implantation and wafer annealing processes are performed in a wafer furnace. Wafer furnaces can process individual wafers or in batches of wafers depending on the particular wafer furnace design and semiconductor process requirements.

Like most semiconductor processing equipment, wafer furnaces often operate nearly continuously in a production line environment. Wafer throughput per hour (WPH) is a very closely monitored performance metric of the wafer furnace. The WPH can be used to identify semiconductor manufacturing process choke points and other less than optimum conditions in the wafer furnace. Typically, the wafer furnace includes a control system that includes pre-programmed operations that the wafer furnace will automatically perform on the wafers that are loaded into an input portion of the wafer furnace.

A wafer furnace operator typically monitors wafer furnace operations. The wafer furnace operator may also be responsible for loading wafers to be processed in the input portion of the wafer furnace and unloading processed wafers from an output portion of the wafer furnace. A furnace operator typically observes the processing of multiple batches of wafers through a wafer furnace during a single operator's working shift. A furnace operator may also perform manual functions and adjustments to the wafer furnace. In addition, a furnace operator may manually process wafers through the wafer furnace.

The overall performance of the wafer furnace as identified by the WPH (wafer throughput per hour) is often monitored to ensure the wafer furnace throughput meets acceptable performance ranges. However, typical WPH monitoring systems cannot differentiate automatic wafer processes from manual operations or operator errors such as misleading wafers in the input portion of the wafer furnace. Typical WPH monitoring systems aggregate multiple batches or lots of wafers that are processed through the wafer furnace to determine the WPH metric.

In view of the foregoing, there is a need for accurate monitoring of the wafer throughput per hour of a wafer furnace.

SUMMARY OF THE INVENTION

Broadly speaking, the present invention fills this need by providing a system and method for monitoring wafer throughput per hour (WPH) of the wafer furnace. It should be appreciated that the present invention can be implemented in numerous ways, including as a process, an apparatus, a system, computer readable media, or a device. Several inventive embodiments of the present invention are described below.

In one aspect of the present invention, a system for monitoring wafer throughput per hour in a wafer furnace is provided. The system includes a database, an analysis unit, a comparison unit, and an output unit. The database includes two or more operation histories of the wafer furnace. The analysis unit is coupled to the database. The analysis unit includes logic (implemented in the form of software or hardware or a combination thereof) that retrieves at least one operation history from the database, determines a standard process time and a specification range for the retrieved operation history, and receives a current process time for the current process. The comparison unit is coupled to the analysis unit. The comparison unit includes logic (implemented in the form of either software or hardware or a combination thereof) that compares the standard process time and the specification range to the current process time. The output unit is coupled to the comparison unit. The output unit includes logic (implemented in the form of either software or hardware or a combination thereof) that outputs a comparison result.

In one embodiment, the standard process time is a mean process time of the retrieved operation history. Alternatively, when the retrieved operation history includes a single operation history, the specification range is about equal to the mean process time of the retrieved operation history. If the retrieved at least one operation history includes multiple operation histories, then the specification range can be a range of mean process times of each of the retrieved operation histories that excludes at least one of a maximum mean process time and a minimum mean process time. In one embodiment, the specification range is equal to a predetermined range about the mean process time of the retrieved at least one operation history.

Each of the operation histories can include a process time for several wafers during a specified time frame. The current process time can include the process time of the most recently completed batch. The specified time frame can includes a single operator shift or a single operator day that includes two or more operator shifts.

In one embodiment, the system further includes an access unit that accesses the database. In one embodiment, the retrieved operation histories of the wafer furnace can exclude overlapping processes and manual processes. In one embodiment, the comparison result is a warning when the current process time falls outside the specification range. The comparison result can include a user notification. In one embodiment, the output unit outputs a comparison result when the received current process time is not within the specification range.

In another aspect of the invention, a method for monitoring wafer throughput per hour (WPH) in a wafer furnace is provided. In this method, at least one operation history is retrieved from a database that includes two or more operation histories of the wafer furnace. A standard process time for the retrieved operation history and a specification range is determined. A current process time for the process is received. The current process time is compared to the standard process time and the specification range. A comparison result is then output.

The system and method of the present invention provide the advantage of allowing a supervisor to review operations of a wafer furnace without regard to wafer lots or lot sizes because individual batches and process can be analyzed. The analysis can be at or near real time so as to provide very timely results to the supervisor.

Other aspects and advantages of the invention will become apparent from the following detailed description, taken in conjunction with the accompanying drawings, illustrating by way of example the principles of the invention.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION OF THE EXEMPLARY EMBODIMENTS

Several exemplary embodiments of a system and method for monitoring wafer throughput per hour (WPH) of a wafer furnace will now be described. It will be apparent to those skilled in the art that the present invention may be practiced without some or all of the specific details set forth herein.

The wafer throughput per hour (WPH) metric is an important metric for monitoring the performance of a wafer furnace. However, the WPH must be accurate to provide truly useful information. In one embodiment of the present invention, the manual wafer processes are separated from the automated wafer processes in the WPH metric because manual processes are inherently too inconsistent due to differences between human operators. Consequently, including the manual processes can cause an inaccurate WPH metric. In another embodiment, an output is provided to notify the operator or an operator's supervisor that the WPH of the wafer furnace being operated by the particular operator is outside of a specified range. In yet another embodiment, an operation range of acceptable WPH is automatically determined.

Figure 1:
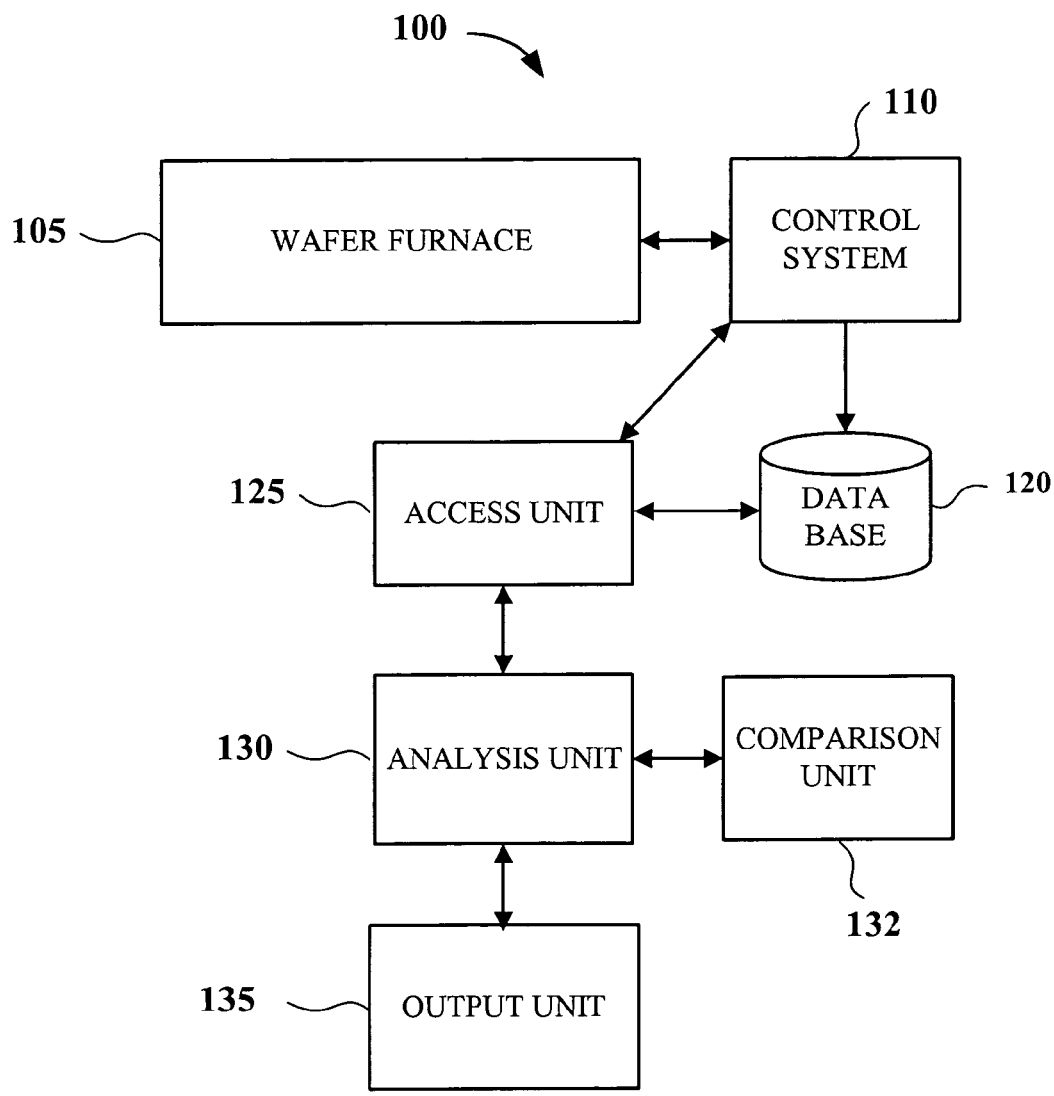
FIG. 1 is a block diagram of an exemplary wafer furnace and monitoring system in accordance with one embodiment of the present invention.

FIG. 1 is a block diagram of an exemplary wafer furnace and monitoring system 100 in accordance with one embodiment of the present invention. A wafer furnace 105 is coupled to a control system 110. The control system 110 controls the wafer furnace 105. The control system 110 can include a computer and memory system for storing and retrieving operational information. Operational information can include one or more operational histories. An operational history can include a record of the wafers processed through the furnace 105 in a given time interval such as, for example, a previous working day and a previous furnace operator's work shift. The record of the wafers processed through the furnace 105 can also include various parameters such as process time for each wafer or batch of wafers and a type of operation (e.g., manual, automatic, automatic operation A, automatic operation, etc.) that was applied to each wafer or batch of wafers.

The control system 110 can also record and output operational history and details from the control system memory and in a database 120. The database 120 includes multiple operation histories for each batch of wafers and each operator's shift. An access unit 125 can be linked to the control system 110 or the database, or both, so that the access unit 125 can retrieve current and past operational histories.

An analysis unit 130 is coupled to the access unit 125. The analysis unit 130 includes the required software and hardware to perform the needed analysis of the data retrieved from the database 120 and the control system 110. The analysis unit 130 can be coupled to a comparison unit 132. The comparison unit 132 includes logic that compares the standard process time and the specification range to the current process time. The analysis unit 130 is also coupled to an output unit 135. The output unit 135 can output a result of the data analysis performed in the analysis unit 130. The output unit 135 can be any type of suitable output device such as, for example, a display or an audio output device. The output unit 135 can also output the data analysis electronically such as, for example, via a communication network or a computer network.

In one embodiment, the analysis unit 130, the access unit 125, the comparison unit 132 and the output unit 135 are combined in a single unit such as a general purpose or special purpose computer. The analysis unit 130, the access unit 125, the comparison unit 132 and the output unit 135 can also be combined as part of the control system 110.

Figure 2:
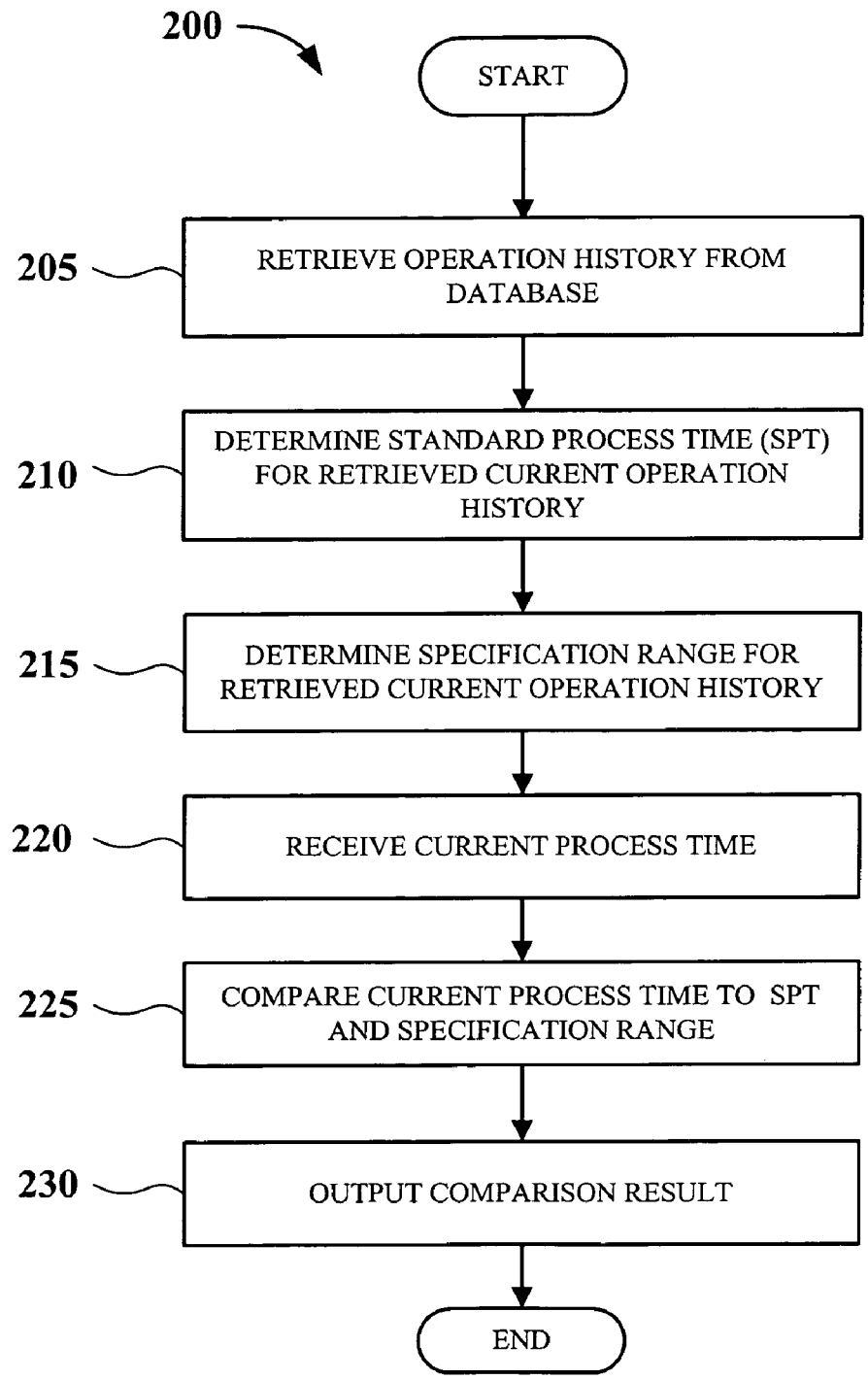
FIG. 2 is a flowchart of the method operations performed in monitoring the wafer throughput per hour (WPH) in a wafer furnace in accordance with one embodiment of the present invention.

FIG. 2 is a flowchart of the method operations 200 performed in monitoring the WPH in a wafer furnace in accordance with one embodiment of the present invention. In operation 205, at least one operation history is retrieved from the database 120 or the control system 110. The retrieved operation history will be used to determine a baseline for comparison. The baseline will include a standard process time (SPT) and a specification range of acceptable process times. The operation histories of the wafer furnace can exclude overlapping processes or manual processes, or both, so as to provide a more accurate WPH metric.

In operation 210, a standard process time (SPT) for the retrieved operation history is determined. Various data mining methods can be used to arrive at the SPT. In one embodiment, the standard process time is a mean (i.e., average) process time of the retrieved operation history. Alternatively, the SPT can be determined using a curve identified from plotted retrieved operation history data, as described in more detail below with reference to FIG. 4. The SPT can also be determined by using the process times that are grouped together, e.g., within a selected range or within a range that includes a pre-selected percentage of the process times for each operation history.

In operation 215, a specification range for the retrieved operation history is determined. The specification range is a range of acceptable process times for each batch. In one embodiment, the specification range is a manually pre-selected range. Alternatively, the specification range can be derived from the retrieved process histories. For example, if a single operation history is retrieved, then the specification range can be 1) about equal to the mean process time of the retrieved operation history, 2) a pre-selected range around the mean process time of the retrieved operation history, or 3) a range defined by the maximum and minimum ranges of the retrieved operation history. Alternatively, if multiple operation histories are retrieved, then the specification range can be a range of mean process times of each of the retrieved operation histories.

In operation 220, a current process time for a most recent processed batch of wafers is received. The current process time can be received from the control system 110 or retrieved from the database 120. In operation 225, the current process time is compared to the standard process time and the specification range. A comparison result is output in operation 230.

Figure 3:
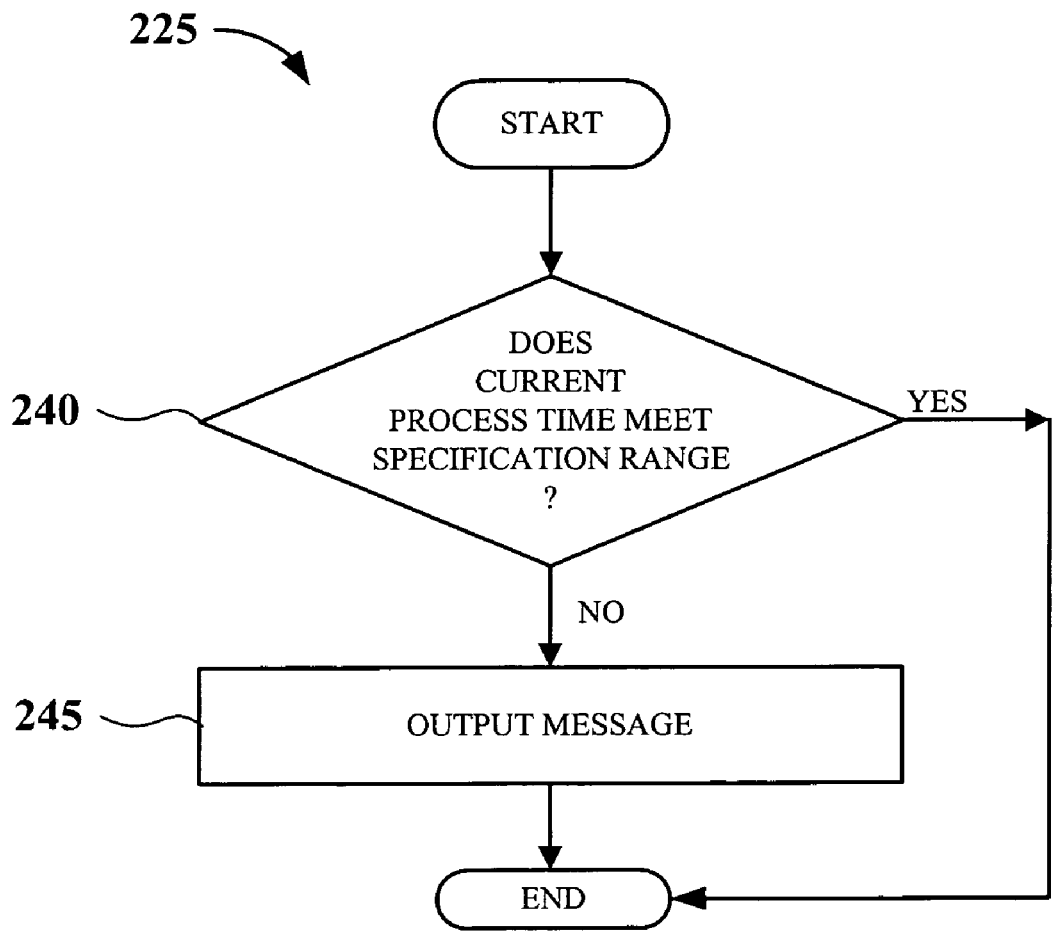
FIG. 3 is a flowchart of the method operations performed in comparing the current process time to the standard process time and the specification range in accordance with one embodiment of the present invention.

FIG. 3 is a flowchart of the method operations 225 performed in comparing the current process time to the standard process time and the specification range in accordance with one embodiment of the present invention. In operation 240, the current process time is compared to the specification range. By way of example, the specification range could include a range of about 4.5 minutes to about 6.25 minutes. If, in operation 240, the current process time is within the specification range (e.g., 5.2 minutes), then no action is required although a "passed" or "acceptable" output could be produced. Alternatively, if in operation 240, the current process time is not within the specification range (e.g., 7.4 minutes), then a message is output in operation 245. The output message may be output to the operator or the operator's supervisor so as to make the supervisor aware of the out of specification condition. The message could also be recorded, e.g., within the database 120. A statistics table of the current operation history can also be output for analysis or efficiency evaluation.

Figure 4:
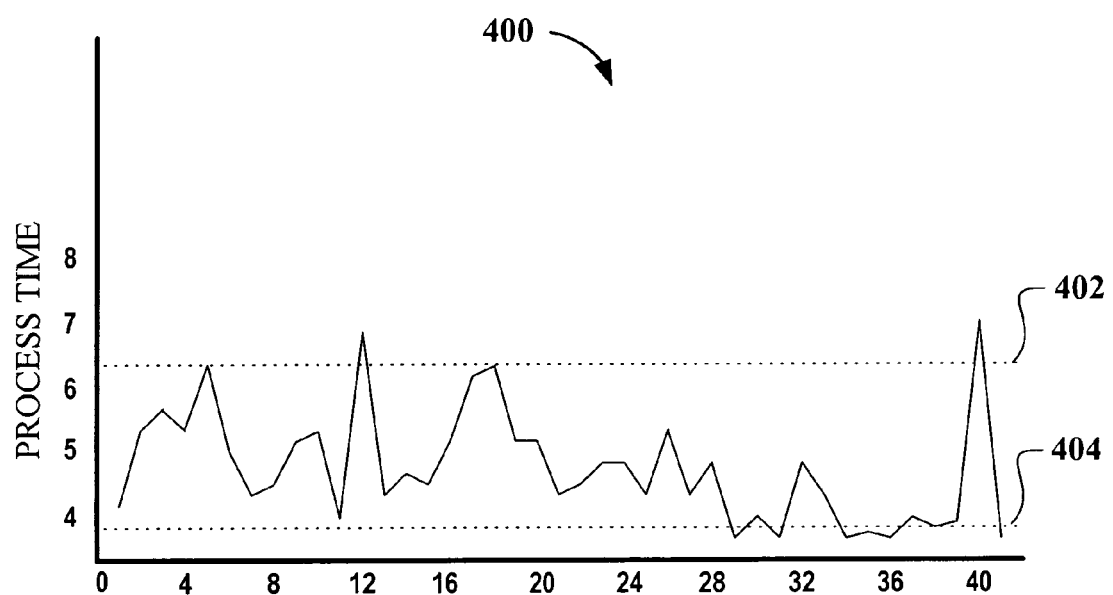
FIG. 4 is a graphical representation of an operation history in accordance with one embodiment of the present invention.

FIG. 4 is a graphical representation of an operation history 400 in accordance with one embodiment of the present invention. The graphical representation of the operation history includes a processing time on the vertical axis and a batch process number on the horizontal axis. For example, batch process 12 required a processing time of about 7 minutes whereas batch process 8 required about 4.5 minutes for processing. In one embodiment, extreme data points can be excluded from being used to determine the SPT and the specification range. For example, high data points that are higher than a given threshold level 402 or low data points that are lower than a low threshold level 404 can be excluded.

The operation history 400 can also include the data that identifies operators such as, for example, a single operator's shift. The operation history can also include operator days that include two or more operator shifts. In this manner, the system can distinguish one operator's performance from another operator's performance so as to allow the supervisor to more easily identify a slower or less efficient operator or an operator that requires additional training so as to reduce operator errors and thereby increase WPH.

As used herein in connection with the description of the invention, the term "about" means +/−10%. By way of example, the phrase "about 5 minutes" indicates a range of between 4.5 minutes and 5.5 minutes.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be further appreciated that the instructions represented by the operations in FIGS. 2 and 3 are not required to be performed in the order illustrated, and that all the processing represented by the operations may not be necessary to practice the invention. Further, the processes described in FIGS. 2 and 3 can also be implemented in software stored in any one of or combinations of the RAM, the ROM, or the hard disk drive.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope of the appended claims and equivalents thereof.

What is claimed is:

1. A system for monitoring wafer throughput per hour in a wafer furnace, comprising:
   a database that includes two or more operation histories of the wafer furnace;
   an analysis unit, the analysis unit being coupled to the database, the analysis unit including:
      logic that retrieves at least one operation history from the database;
      logic that determines a standard process time for the retrieved at least one operation history and a specification range; and
      logic that receives a current process time for a current process;
   a comparison unit coupled to the analysis unit, the comparison unit including logic that compares the standard process time and the specification range to the current process time; and
   an output unit coupled to the comparison unit and including logic that outputs a comparison result.

2. The system of claim 1, wherein the standard process time is a mean process time of the at least one retrieved operation history.

3. The system of claim 1, wherein when the at least one retrieved operation history includes a single operation history, the specification range is about equal to the mean process time of the at least one retrieved operation history.

4. The system of claim 1, wherein when the at least one retrieved operation history includes a plurality of retrieved operation histories, the specification range is a range of mean process times of each of the retrieved operation histories that excludes at least one of a maximum mean process time and a minimum mean process time.

5. The system of claim 1, wherein the specification range is about equal to a predetermined range about the mean process time of the retrieved at least one operation history.

6. The system of claim 1, wherein each of the two or more operation histories includes a process time for a plurality of wafers during a specified time frame.

7. The system of claim 6, wherein the current process time includes the process time of a most recently completed batch.

8. The system of claim 6, wherein the specified time frame includes a single operator shift.

9. The system of claim 6, wherein the specified time frame includes a single operator day that includes two or more operator shifts.

10. The system of claim 1, wherein the comparison result is a warning when the current process time falls outside the specification range.

11. The system of claim 1, further comprising an access unit that accesses the database.

12. The system of claim 1, wherein the two or more operation histories of the wafer furnace excludes overlapping processes.

13. The system of claim 1, wherein the two or more operation histories of the wafer furnace excludes manual processes.

14. The system of claim 1, wherein the comparison result includes a user notification.

15. The system of claim 1, wherein the output unit outputs a comparison result when the received current process time is not within the specification range.

16. A method for monitoring wafer throughput per hour in a wafer furnace, comprising:

retrieving at least one operation history from a database that includes two or more operation histories of the wafer furnace;

determining a standard process time for the at least one retrieved operation history and a specification range;

receiving a current process time for a current process;

comparing the standard process time and the specification range to the current process time; and outputting a comparison result.

17. The method of claim 16, wherein the standard process time is a mean process time of the at least one retrieved operation history.

18. The method of claim 16, wherein when the at least one retrieved operation history includes a single operation history, the specification range is about equal to the mean process time of the retrieved at least one operation history.

19. The method of claim 16, wherein when the at least one retrieved operation history includes a plurality of operation histories, the specification range is a range of mean process times of each of the retrieved operation histories that excludes at least one of a maximum mean process time and a minimum mean process time.

20. The method of claim 16, wherein the specification range is equal to a predetermined range about the mean process time of the retrieved at least one operation history.

* * * * *